(12) United States Patent
Peng (10) Patent No.: US 11,255,459 B1
(45) Date of Patent: Feb. 22, 2022

(54) PRESSING-CONTROLLED VALVE FOR FLUID

(71) Applicant: KUCHING INTERNATIONAL LTD., Taichung (TW)

(72) Inventor: Hao-Nan Peng, Taichung (TW)

(*) Notice: Subject to any disclaimer, the term of this patent is extended or adjusted under 35 U.S.C. 154(b) by 0 days.

(21) Appl. No.: 17/034,600

(22) Filed: Sep. 28, 2020

(51) Int. Cl.
*F16K 31/52* (2006.01)
*F16K 31/528* (2006.01)

(52) U.S. Cl.
CPC ................................. *F16K 31/5286* (2013.01)

(58) Field of Classification Search
CPC ..... F16K 31/52; F16K 31/528; F16K 31/5286
USPC ......................................................... 251/252
See application file for complete search history.

(56) References Cited

U.S. PATENT DOCUMENTS

| 3,507,475 | A | * | 4/1970 | Davis | B67D 1/1438 |
| | | | | | 251/120 |
| 4,221,238 | A | * | 9/1980 | Madsen | F16K 31/528 |
| | | | | | 137/627.5 |
| 2018/0163382 | A1 | * | 6/2018 | Yuan | E03C 1/122 |

* cited by examiner

*Primary Examiner* — Paul J Gray
(74) *Attorney, Agent, or Firm* — Egbert, McDaniel & Swartz, PLLC (57) ABSTRACT

A pressing-controlled valve for fluid has a valve casing, valve seat, fixed valve plate, movable valve plate, driving piece, press structure and a pulling structure, wherein the valve seat is assembled on one end of the valve casing. The fixed valve plate, movable valve plate and driving piece are disposed in the valve casing. The fixed valve plate is in watertight contact with the valve seat, and the movable valve plate and valve plate overlap. A flow channel for fluid is formed among the valve seat, fixed valve plate and movable valve plate. The driving piece is in contact with the movable valve plate. The pulling structure includes a shaft lever and drawing piece. The press structure pulls the shaft lever to move, and the shaft lever pulls the drawing piece through a pull rod, so that the driving piece drives the movable valve plate to slide laterally.

12 Claims, 7 Drawing Sheets

PRESSING-CONTROLLED VALVE FOR FLUID

CROSS-REFERENCE TO RELATED U.S. APPLICATIONS

Not applicable.

STATEMENT REGARDING FEDERALLY SPONSORED RESEARCH OR DEVELOPMENT

Not applicable.

NAMES OF PARTIES TO A JOINT RESEARCH AGREEMENT

Not applicable.

REFERENCE TO AN APPENDIX SUBMITTED ON COMPACT DISC

Not applicable.

BACKGROUND OF THE INVENTION

1. Field of the Invention

The present invention relates generally to a piping installation for controlling fluid, and more particularly to a pressing-controlled valve for fluid.

2. Description of Related Art Including Information Disclosed Under 37 CFR 1.97 and 37 CFR 1.98

The conventional press-operated fluid control valve uses a press structure to pull a valve handle to move back and forth in axial direction, the internal flow path on/off of the control valve is changed to control the water to or not to flow through the control valve, the water flow cannot be regulated.

The known pull-operated fluid control valve comprises a valve casing, a valve handle, a driving seat, a movable valve plate, a fixed valve plate and a valve seat, wherein the driving seat, the movable valve plate and the fixed valve plate are assembled in the valve casing. The movable valve plate and the fixed valve plate are made of ceramics respectively. The movable valve plate and the fixed valve plate overlap each other. The driving seat is in contact with the movable valve plate. The valve seat is assembled on one end of the valve casing. The fixed valve plate is in contact with the valve seat. One end of the valve handle is in contact with the driving seat, the other end of the valve handle protrudes out of the valve casing.

When the valve handle is pulled laterally, the valve handle pulls the driving seat to slide laterally, so that the movable valve plate slides laterally, so as to change the flow of water or to control the water to or not to flow through the control valve.

BRIEF SUMMARY OF THE INVENTION

The main objective of the present invention is to provide a pressing-controlled valve for fluid, which can enhance the handiness and can control the flow or on/off.

The present invention is a pressing-controlled valve for fluid which comprises a valve casing, a valve seat, a fixed valve plate, a movable valve plate, a driving piece, a press structure and a pulling structure, wherein the valve casing has a first end and a second end, the first end is opposite to the second end. The valve seat is assembled on the first end. The fixed valve plate, the movable valve plate and the driving piece are disposed in the valve casing. The fixed valve plate is in watertight contact with the valve seat. The movable valve plate and the fixed valve plate overlap each other. A flow channel for fluid is formed among the valve seat, the fixed valve plate and the movable valve plate. The driving piece is in contact with the movable valve plate, so that the driving piece drives the movable valve plate to slide laterally to regulate the flow of the fluid through the flow channel or the on/off of the flow channel.

The press structure is adjacent to the second end. The press structure comprises a press cap, a positioning element and a follower, wherein the positioning element is provided with a positioning structure, and the press cap is axially pivoted on the positioning element. The follower is axially opposite to the press cap, so that the press cap presses the follower to move axially, the follower is located in a first position or a second position by the positioning structure.

The pulling structure is located between the press structure and the driving piece. The pulling structure comprises a joint holder, a shaft lever, a spring and a drawing piece, wherein the joint holder is disposed in the valve casing, and the joint holder is located between the follower and the driving piece. The joint holder is provided with a pivot hole, and the shaft lever penetrates through the pivot hole. The shaft lever is axially put in the spring. Both ends of the spring prop the follower and the joint holder respectively. One end of the shaft lever axially contacts the follower, and the other end of the shaft lever is provided with a pull rod. The major axis direction of the shaft lever is defined as the first direction Z, and the major axis direction of the pull rod is the second direction X. The first direction Z intersects the second direction X. The drawing piece is in contact with the driving piece. The drawing piece is provided with a long guide channel One end of the guide channel is close to the shaft lever, the other end of the guide channel is close to the driving piece, an oblique pattern is formed between both ends of the guide channel. The pull rod is pivoted in the guide channel, hereby, the follower pulls the shaft lever to move back and forth. The pull rod slides between both ends of the guide channel, forcing the drawing piece to slide laterally, the drawing piece draws the driving piece the drive the movable valve plate to slide laterally, so as to enhance the handiness of flow control or the on/off of the flow channel.

The movable valve plate can slide laterally against the fixed valve plate when the press cap is pressed, so as to regulate the flow of the fluid through the flow channel or the on/off of the flow channel.

DETAILED DESCRIPTION OF THE INVENTION

Figure 1:
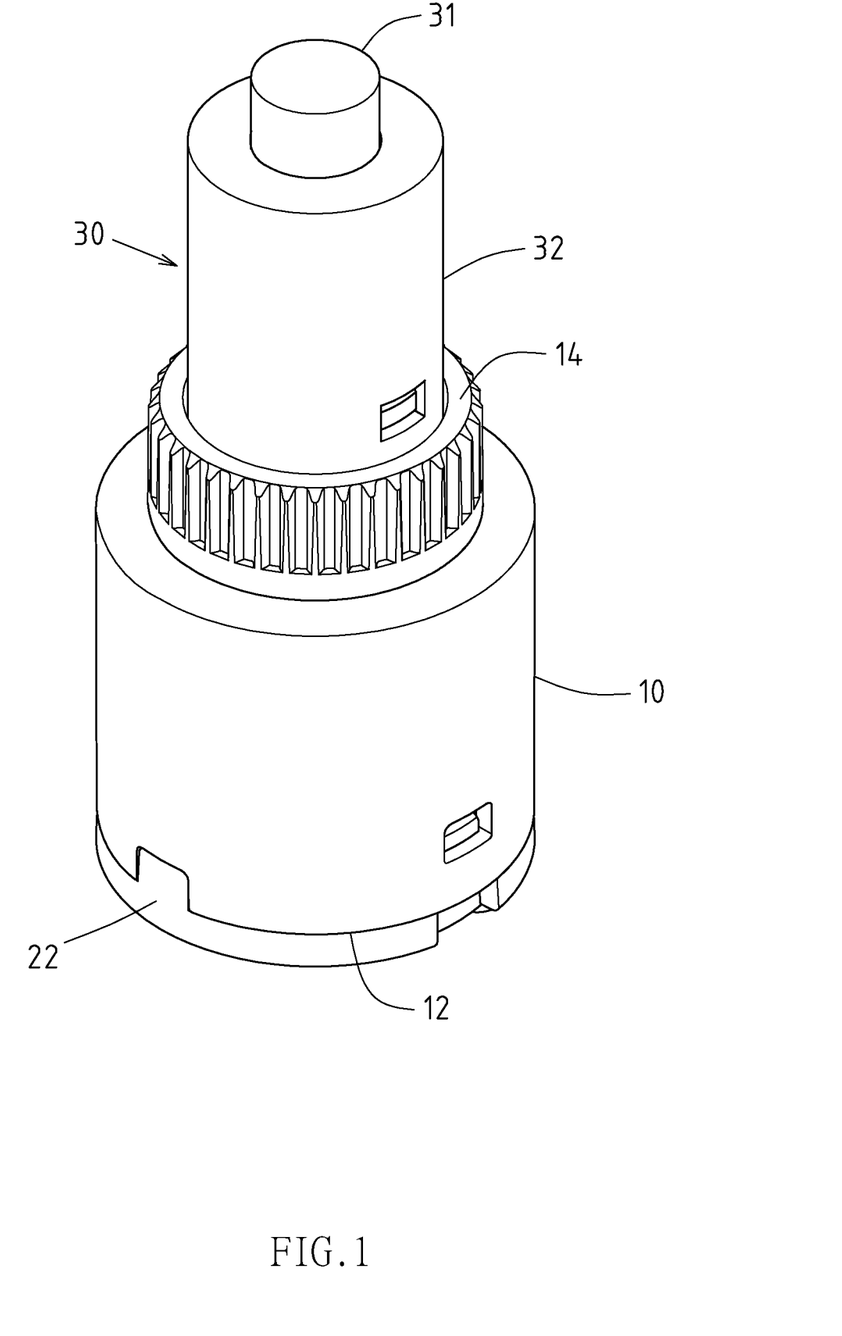
FIG. 1 is a perspective view of the preferred embodiment of the present invention.
Figure 2:
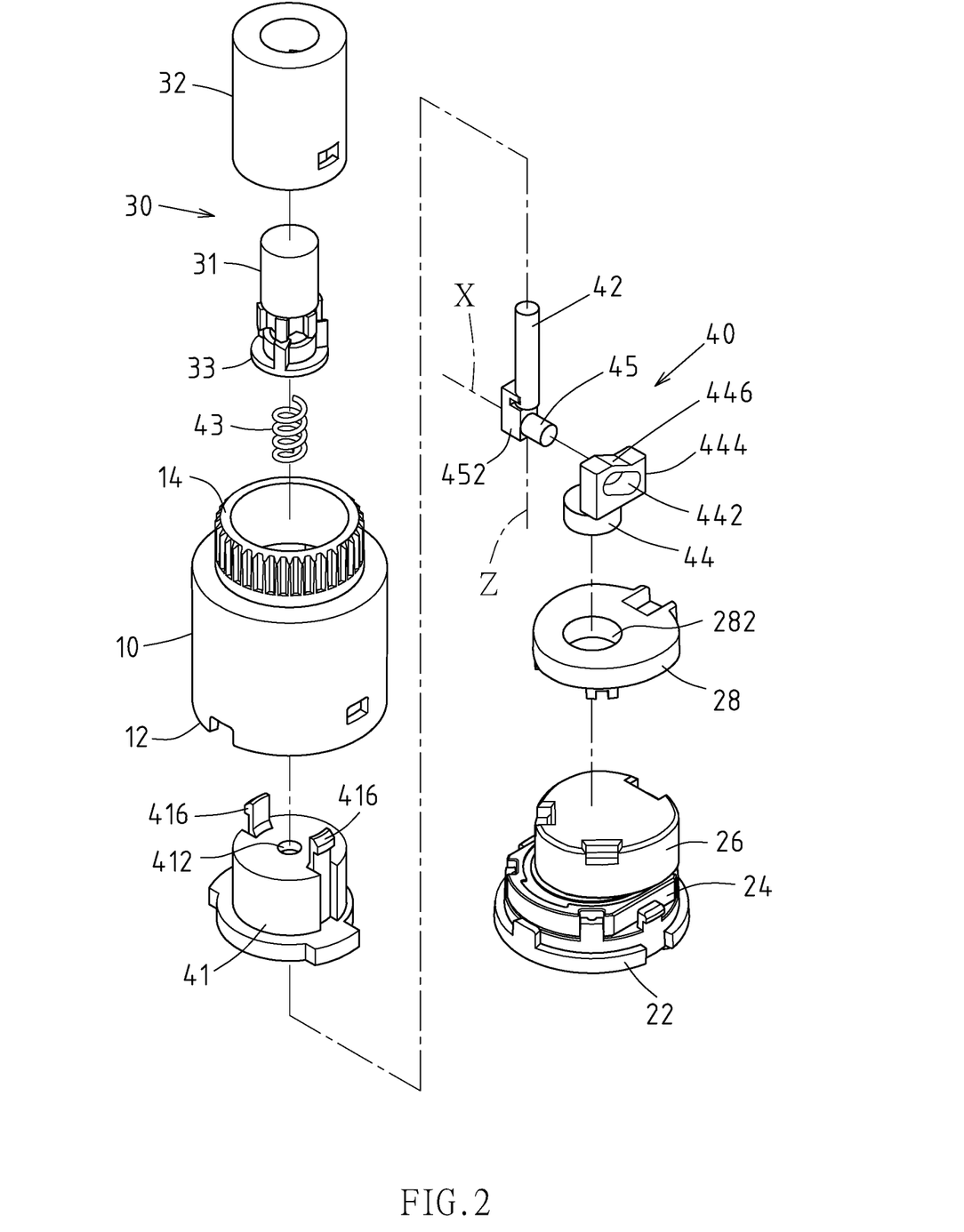
FIG. 2 is a three-dimensional exploded view of the preferred embodiment of the present invention.
Figure 3:
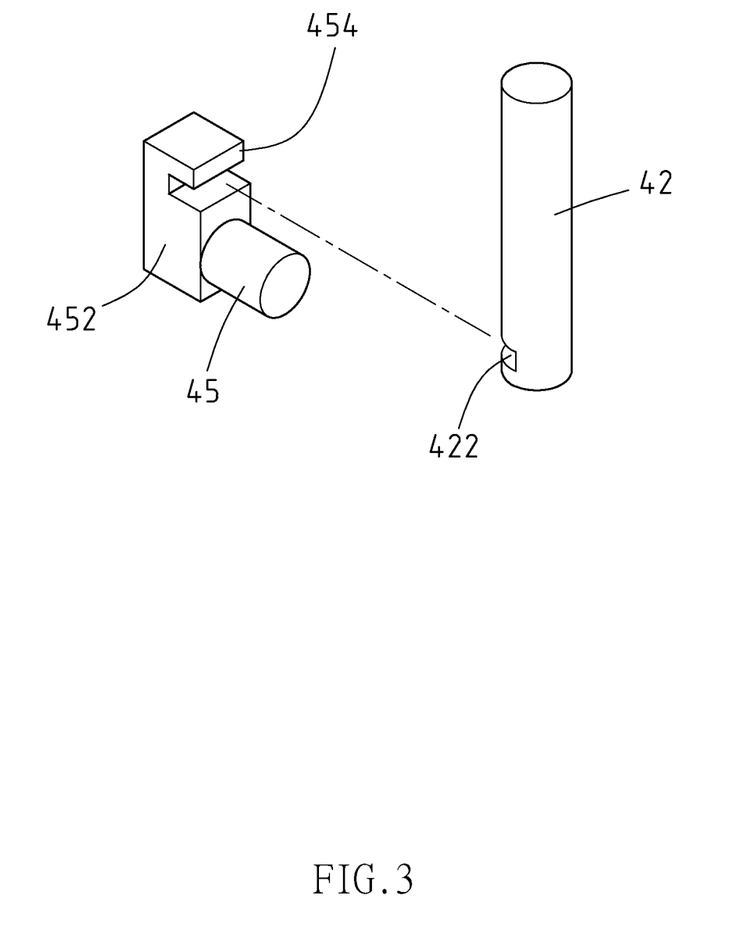
FIG. 3 is a three-dimensional exploded view of shaft lever and pull rod in the preferred embodiment of the present invention.
Figure 4:
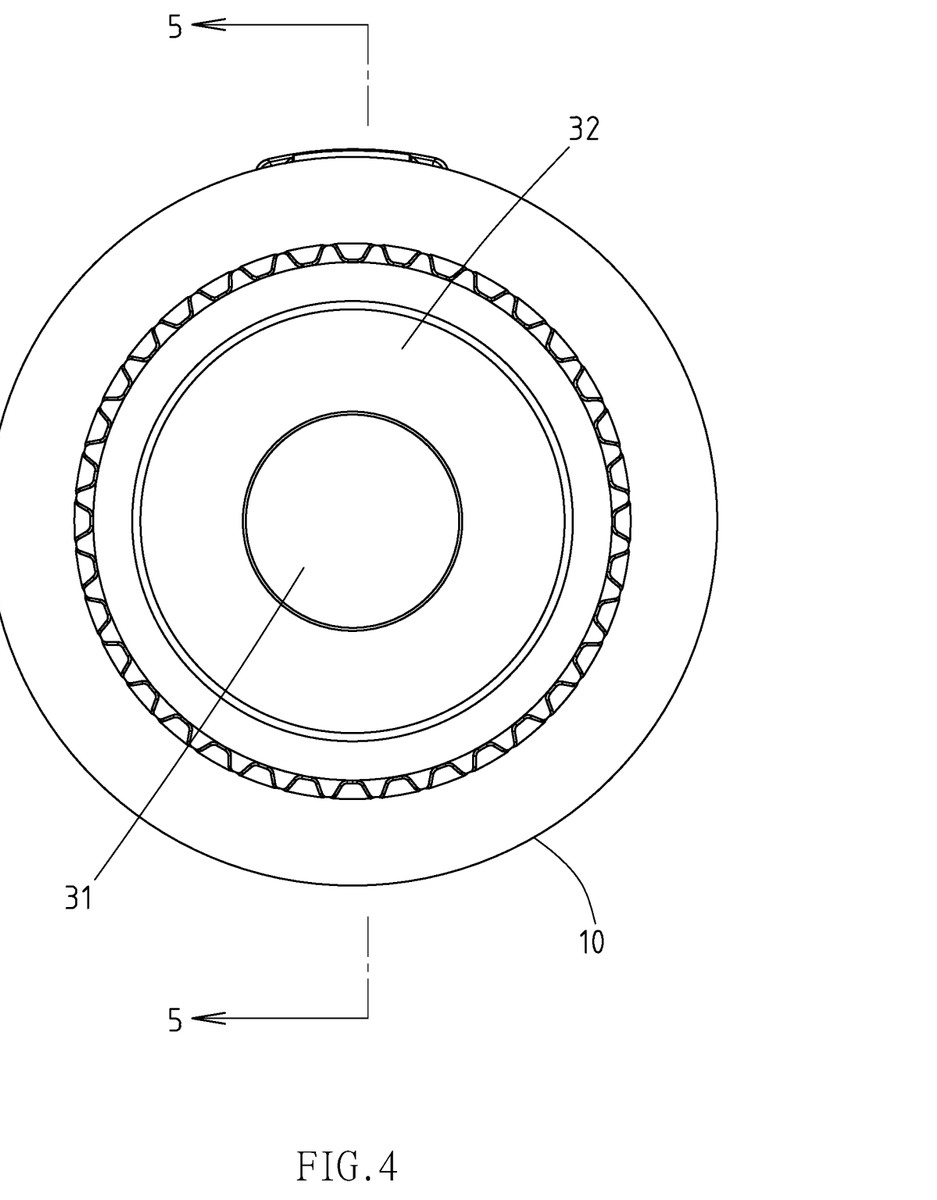
FIG. 4 is a top view of the preferred embodiment of the present invention.
Figure 5:
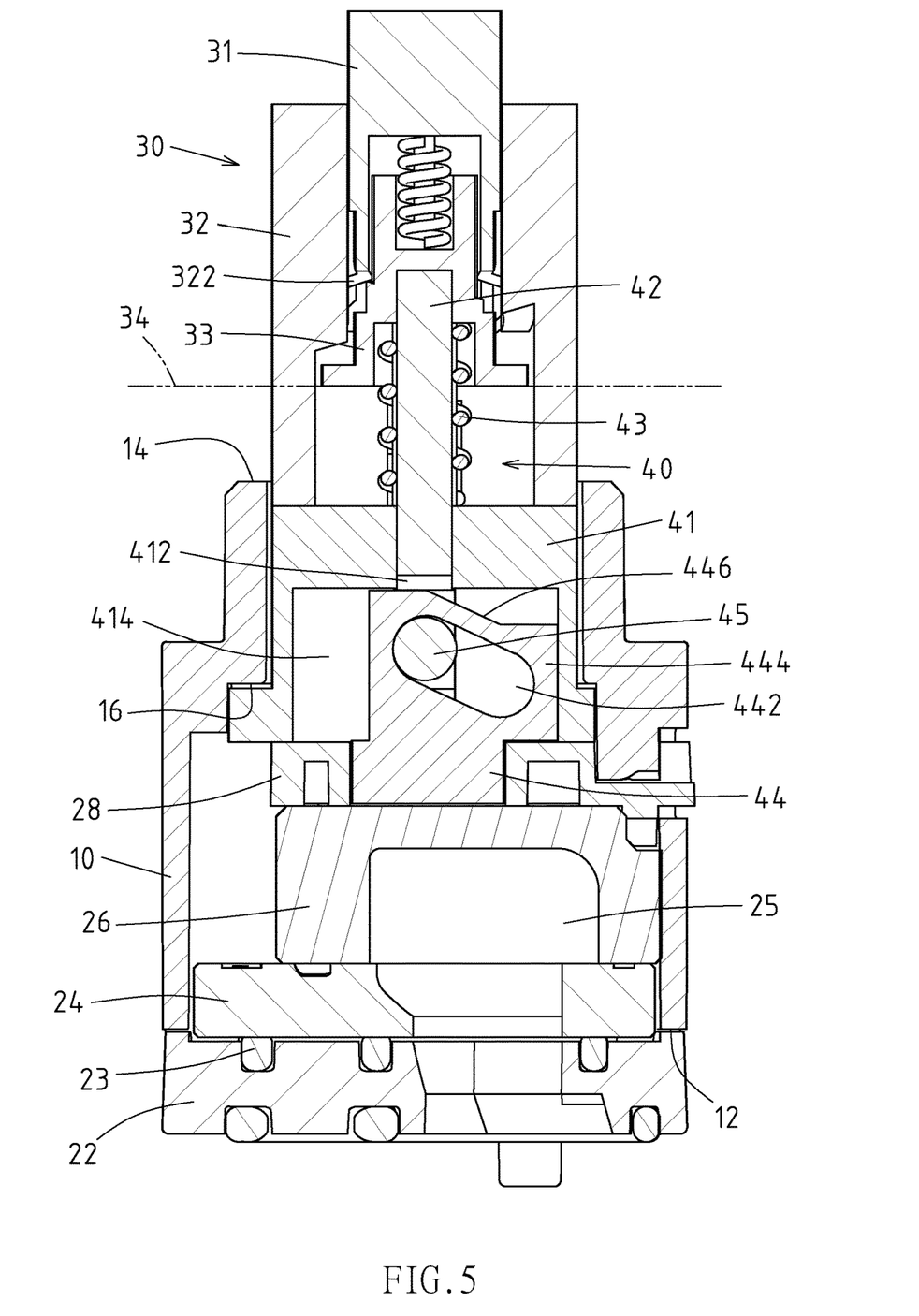
FIG. 5 is the 5-5 sectional view of FIG. 4.
Figure 6:
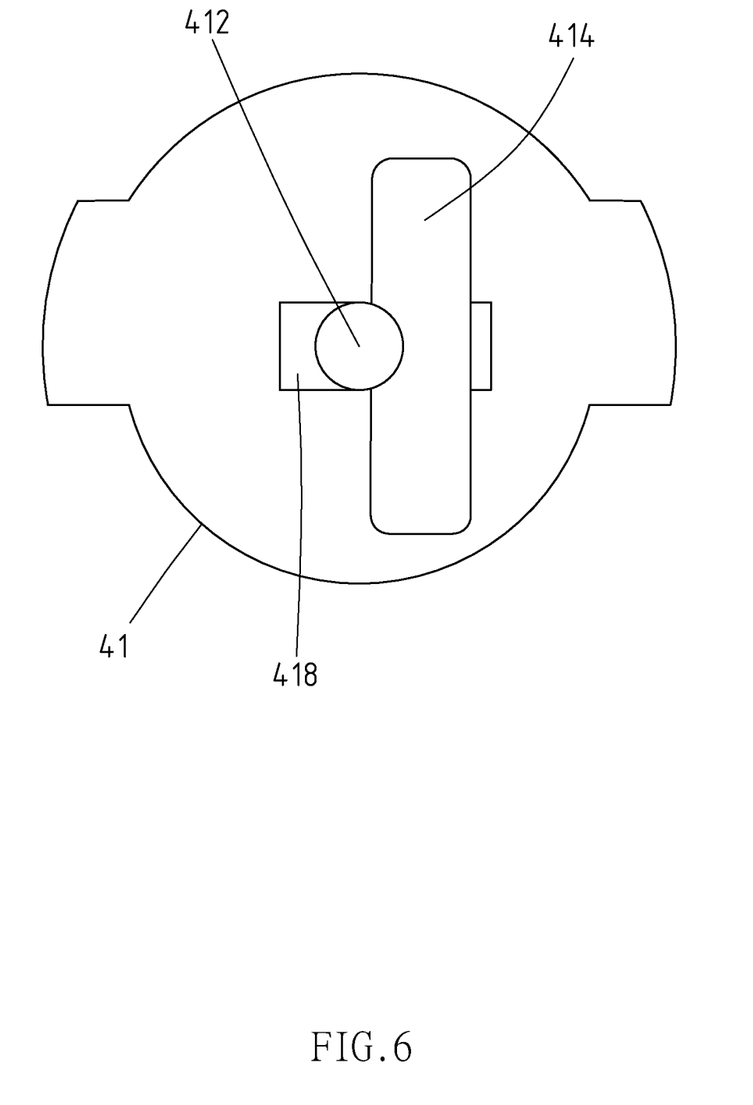
FIG. 6 is an upward view of joint holder in the preferred embodiment of the present invention.
Figure 7:
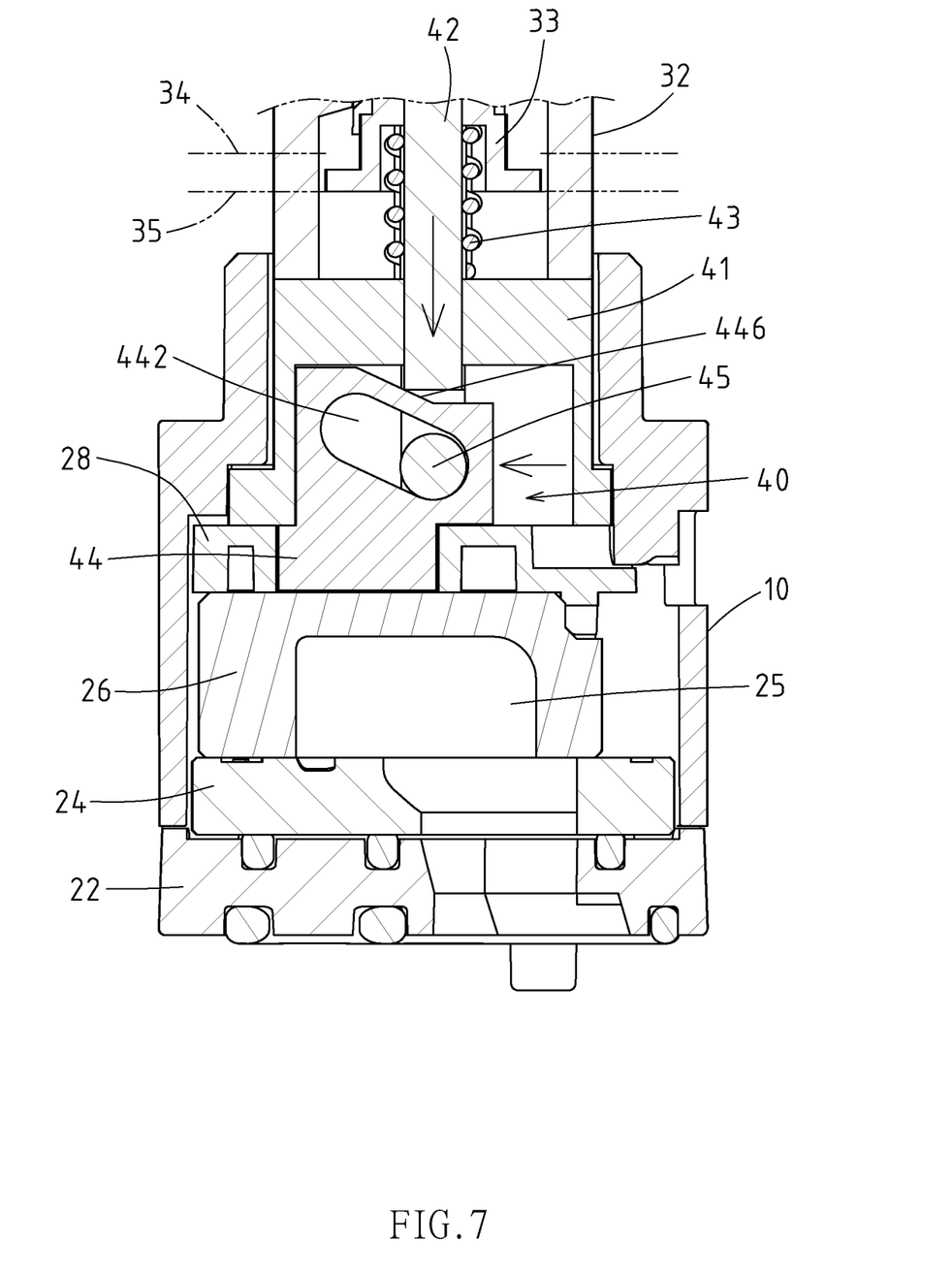
FIG. 7 is a sectional view of operating state in the preferred embodiment of the present invention.

As shown in FIG. 1 to FIG. 7, the preferred embodiment of the present invention comprises a valve casing 10, a valve seat 22, a fixed valve plate 24, a movable valve plate 26, a driving piece 28, a press structure 30 and a pulling structure 40, wherein the valve casing 10 has a first end 12 and a second end 14, the first end 12 is opposite to the second end 14. The valve seat 22 is disposed on the first end 12. The fixed valve plate 24, the movable valve plate 26 and the driving piece 28 are disposed in the valve casing 10. The fixed valve plate 24 is in watertight contact with the valve seat 22 through a leak stop element 23. The movable valve plate 26 and the fixed valve plate 24 overlap each other. A flow channel 25 for fluid (not shown in the figure) is formed among the valve seat 22, the fixed valve plate 24 and the movable valve plate 26. The driving piece 28 is in contact with the movable valve plate 26, so that the driving piece 28 drives the movable valve plate 26 to slide laterally to regulate the flow of the fluid through the flow channel 25 or the on/off of the flow channel 25.

The specific construction of the flow channel 25 shown in the figures is only an example, not to limit the explanation of the present invention. In different patterns of the flow channel 25, when the movable valve plate 26 is actuated, the change is changed, the flow channel 25 is opened or closed or the mixing ratio of fluids with different properties (e.g. temperature) is changed. The persons of related technical fields can change the construction of the flow channel 25 according to the application target.

The press structure 30 is adjacent to the second end 14. The press structure 30 comprises a press cap 31, a positioning element 32 and a follower 33. Wherein the positioning element 32 is provided with a positioning structure 322, the press cap 31 is pivoted on the positioning element 32, the follower 33 is axially opposite to the press cap 31, so that the press cap 31 presses the follower 33 to move axially. The follower 33 is located in a first position 34 or a second position 35 by the positioning structure 322. The press structure 30 is often seen in the pressing-controlled valve for fluid, it is the existing technology the persons of the same domain are familiar to, the specific construction of the press structure 30 will not be described in detail.

The pulling structure 40 is located between the press structure 30 and the driving piece 28. The pulling structure 40 comprises a joint holder 41, a shaft lever 42, a spring 43 and a drawing piece 44. Wherein the joint holder 41 is disposed in the valve casing 10, and the joint holder 41 is located between the follower 33 and the driving piece 28. The joint holder 41 is provided with a pivot hole 412, the shaft lever 42 penetrates through the pivot hole 412. The shaft lever 42 is axially put in the spring 43. Both ends of the spring 43 prop the follower 33 and the joint holder 41 respectively. One end of the shaft lever 42 axially contacts the follower 33, the other end of the shaft lever 42 is provided with a pull rod 45. The major axis direction of the shaft lever 42 is defined as the first direction Z, the major axis direction of the pull rod 45 is the second direction X, the first direction Z intersects the second direction X. Furthermore, the orthogonal intersection of the first direction Z and the second direction X is a better implementation. The drawing piece 44 is in contact with the driving piece 28. The drawing piece 44 is provided with a long guide channel 442. One end of the guide channel 442 is close to the shaft lever 42, the other end of the guide channel 442 is close to the driving piece 28, forming an oblique pattern between both ends of the guide channel 442. The pull rod 45 is pivoted in the guide channel 442, hereby, the follower 33 pulls the shaft lever 42 to move back and forth. The pull rod 45 slides between both ends of the guide channel 442, forcing the drawing piece 44 to slide laterally. The drawing piece 44 draws the driving piece 28 to drive the movable valve plate 26 to slide laterally, so as to enhance the handiness of flow control or the on/off of the flow channel 25.

When the press cap 31 is pressed, the follower 33 moves from the first position 34 to the second position 35, so that the shaft lever 42 is actuated towards the drawing piece 28. The pull rod 45 presses the drawing piece 44, as the guide channel 442 of oblique pattern is opposite to the pulling piece 45, the drawing piece 45 pulls the driving piece 28 to slide to the left of the figure, and the movable valve plate 26 is driven by the driving piece 28 to slide to the left of the figure, so as to change the flow channel 25, and to regulate the flow of the fluid through the flow channel 25 or the on/off of the flow channel 25.

When the press cap 31 is pressed again, the spring 43 provides an elastic force, the follower 33 is actuated from the second position 35 to the first position 34, the shaft lever 42 is actuated away from the driving piece 28, the pull rod 45 forms a pulling effect on the drawing piece 44. As the guide channel 442 of oblique pattern is opposite to the pulling piece 45, the drawing piece 44 and the driving piece 28 turn from the state in FIG. 7 into the state in FIG. 5, so as to change the flow channel 25.

A first slot 414 is formed inside the joint holder 41. A bulge 444 protrudes from the drawing piece 44 towards the press structure 30. The guide channel 442 is formed in the bulge 444, the bulge 444 is pivoted in the first slot 414, so that the joint holder 41 confines the direction of actuation of the drawing piece 44. The joint holder 41 has two hooking parts 416, the hooking parts 416 are hooked with the positioning element 32 respectively, so that the joint holder 41 is in contact with the positioning element 32, and the positioning element 32 is positioned.

The pull rod 45 is provided with a connecting part 452, the connecting part 452 is in contact with the shaft lever 42. A second slot 418 is formed inside the joint holder 41. The connecting part 452 is pivoted in the second slot 418. An embedding groove 422 is formed on one side of the shaft lever 42. The connecting part 452 is provided with an insert 454, the insert 454 is embedded in the embedding groove 422, so that the connecting part 452 is in contact with the shaft lever 42.

The driving piece 28 can be provided with an insert hole 282, the drawing piece 44 is embedded in the insert hole 282. The valve casing 10 has a ring surface 16, the ring surface 16 is located between the first end 12 and the second end 14. The joint holder 41 is located between the ring surface 16 and the driving piece 28. The ring surface 16 limits the joint holder 41, so as to position the joint holder 41. The joint holder 41 and the driving piece 28 overlap each other.

A bevel face 446 is formed on one side of the bulge 444 facing the shaft lever 42, matching the oblique pattern of the guide channel 442, so that the shaft lever 42 is adjacent to the bulge 444, to avoid interference between the shaft lever 42 and the bulge 444 in the actuation of the shaft lever 42.

The preferred embodiment can be changed to another embodiment, the major difference of another embodiment is that the drawing piece 44 is integrated with the driving piece 28, so that the bulge 444 and the connecting part 452 are pivoted in the joint holder 41 as the joint holder 41 is in contact with the positioning element 32. When the positioning element 32 is rotated, the positioning element 32 can drive the drawing piece 44 to rotate with the joint holder 41, and the drawing piece 44 drives the movable valve plate 26 to rotate against the fixed valve plate 24, the flow of the fluid through the flow channel 25 is regulated or the on/off of the flow channel 25 is controlled by rotating the positioning element 32.

I claim:

1. A pressing-controlled valve for fluid, comprising a valve casing, a valve seat, a fixed valve plate, a movable valve plate, a driving piece, a press structure and a pulling structure, wherein the valve casing has a first end and a second end, the first end is opposite to the second end; the valve seat is assembled on the first end; the fixed valve plate, the movable valve plate and the driving piece are disposed in the valve casing; the fixed valve plate is in watertight contact with the valve seat; the movable valve plate and the fixed valve plate overlap each other; a flow channel for fluid is formed among the valve seat, the fixed valve plate and the movable valve plate; the driving piece is in contact with the movable valve plate, so that the driving piece drives the movable valve plate to slide laterally to regulate the flow of the fluid through the flow channel or the on/off of the flow channel; the press structure is adjacent to the second end; the press structure comprises a press cap, a positioning element and a follower, wherein the positioning element is provided with a positioning structure, the press cap is axially pivoted on the positioning element; the follower is axially opposite to the press cap, so that the press cap presses the follower to move axially, the follower is located in a first position or a second position by the positioning structure; the pulling structure is located between the press structure and the driving piece; the pulling structure comprises a joint holder, a shaft lever, a spring and a drawing piece, wherein the joint holder is disposed in the valve casing, and the joint holder is located between the follower and the driving piece; the joint holder is provided with a pivot hole, the shaft lever penetrates through the pivot hole; the shaft lever is axially put in the spring; both ends of the spring prop the follower and the joint holder respectively; one end of the shaft lever axially contacts the follower, the other end of the shaft lever is provided with a pull rod; the major axis direction of the shaft lever is defined as a first direction Z, the major axis direction of the pull rod is a second direction X; the first direction Z intersects the second direction X; the drawing piece is in contact with the driving piece; the drawing piece is provided with a long guide channel; one end of the guide channel is close to the shaft lever, the other end of the guide channel is close to the driving piece, an oblique pattern is formed between both ends of the guide channel; the pull rod is pivoted in the guide channel, hereby, the follower pulls the shaft lever to move back and forth; the pull rod slides between both ends of the guide channel, forcing the drawing piece to slide laterally, the drawing piece draws the driving piece the drive the movable valve plate to slide laterally, so as to enhance the handiness of flow control or the on/off of the flow channel.

2. The pressing-controlled valve for fluid defined in claim 1, wherein a first slot is formed inside the joint holder, a bulge protrudes from the drawing piece towards the press structure, the guide channel is formed in the bulge, the bulge is pivoted in the first slot, so that the joint holder confines the direction of actuation of the drawing piece.

3. The pressing-controlled valve for fluid defined in claim 2, wherein the joint holder is in contact with the positioning element, the drawing piece is integrated with the driving piece, so that the positioning element drives the driving piece to rotate with the joint holder and the drawing piece.

4. The pressing-controlled valve for fluid defined in claim 1, wherein the joint holder has two hooking parts, the hooking parts are hooked with the positioning element respectively, so as to position the positioning element.

5. The pressing-controlled valve for fluid defined in claim 2, wherein the joint holder has two hooking parts, the hooking parts are hooked with the positioning element respectively, so as to position the positioning element.

6. The pressing-controlled valve for fluid defined in claim 3, wherein the joint holder has two hooking parts, the hooking parts are hooked with the positioning element respectively, so as to position the positioning element.

7. The pressing-controlled valve for fluid defined in claim 2, wherein the pull rod is provided with a connecting part, the connecting part is in contact with the shaft lever, a second slot is formed inside the joint holder, the connecting part is pivoted in the second slot.

8. The pressing-controlled valve for fluid defined in claim 5, wherein an embedding groove is formed on one side of the shaft lever, the connecting part is provided with an insert, the insert is embedded in the embedding groove, so that the connecting part is in contact with shaft lever.

9. The pressing-controlled valve for fluid defined in claim 1, wherein the first direction Z is orthogonal to the second direction X.

10. The pressing-controlled valve for fluid defined in claim 1, wherein the driving piece is provided with an insert hole, the drawing piece is embedded in the insert hole.

11. The pressing-controlled valve for fluid defined in claim 1, wherein the valve casing has a ring surface, the ring surface is located between the first end and the second end, the joint holder is located between the ring surface and the driving piece, and the ring surface limits the joint holder, so as to position the joint holder.

12. The pressing-controlled valve for fluid defined in claim 1, wherein a bevel face matching the oblique pattern of the guide channel is formed on one side of the bulge facing the shaft lever.

* * * * *